June 5, 1951 W. R. PETERSON 2,555,558
WAGON UNLOADER AND ELEVATOR POWER DRIVE MECHANISM
Filed Dec. 22, 1947 2 Sheets-Sheet 1

Inventor
W. R. Peterson
Paul O. Pippel
Atty.

June 5, 1951 W. R. PETERSON 2,555,558
WAGON UNLOADER AND ELEVATOR POWER DRIVE MECHANISM
Filed Dec. 22, 1947 2 Sheets-Sheet 2

Inventor
W. R. Peterson

Paul O. Pippel
Atty.

Patented June 5, 1951

2,555,558

UNITED STATES PATENT OFFICE 2,555,558

WAGON UNLOADER AND ELEVATOR POWER DRIVE MECHANISM

Walter R. Peterson, Hinsdale, Ill., assignor to International Harvester Company, a corporation of New Jersey Application December 22, 1947, Serial No. 793,137

5 Claims. (Cl. 214—83.14)

This invention relates to a vehicle having an improved type of unloading mechanism and more particularly to an unloading mechanism for delivering material to an elevating device.

More specifically, this invention relates to a vehicle having a movable bottom and a scraper mechanism for unloading a load carried on said vehicle, said mechanism being actuated by the power unit of an elevating device.

The prime object of this invention is to provide an improved mechanism for unloading a vehicle having a movable bottom.

Another object is to provide an improved scraping mechanism on a vehicle, said mechanism being arranged to engage a portion of the load carried thereon and to deliver the same to a material elevating mechanism.

Still another object is to provide a scraper mechanism carried on a vehicle, said mechanism having a driving connection with an elevating device.

A still further object is to provide a scraper mechanism mounted on a vehicle for unloading the same, said mechanism being connected to the power unit of an elevating device by means of a quick detachable flexible drive member.

The embodiment herein shown and described generally comprises a vehicle having a conveyor means arranged to carry a load thereon to the discharge end of said vehicle. A scraper mechanism is carried near the discharge end of the vehicle for engaging the load and discharging the same to an elevating mechanism. The elevating mechanism includes a power drive unit which may readily be connected for actuating the scraper mechanism by means of a flexible drive arranged so that it may be quickly attached and detached from the vehicle. These and other objects will become more apparent upon reading of the description when examined in conjunction with the drawings.

Figures 1, 2, 4:
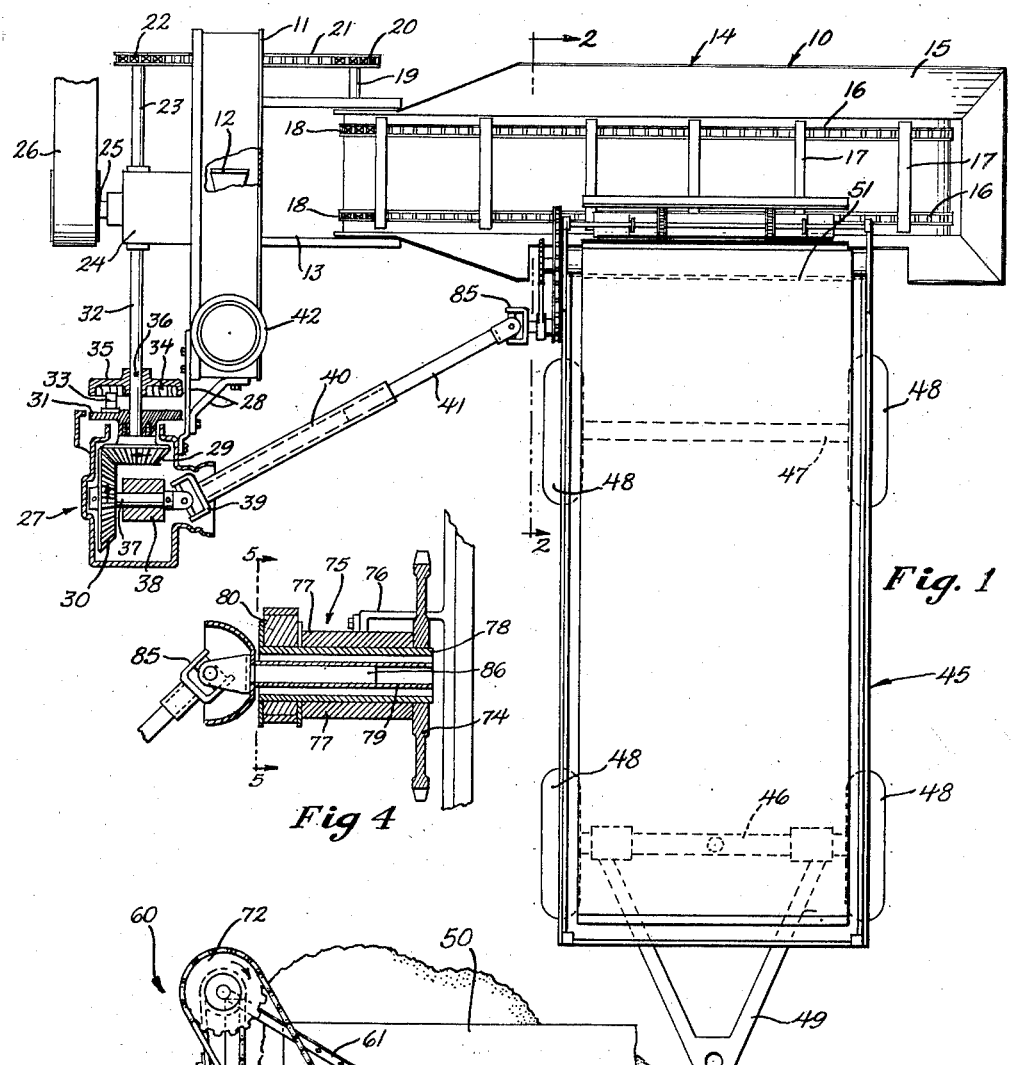
Figure 1 is a plan view of a vehicle having an unloading mechanism, said mechanism being in position to discharge material to the conveyor of an elevating mechanism.
Figure 2 is a side elevational view of the vehicle and section of the conveyor, said view being substantially taken along the line 2—2 of Figure 1.
Figure 4 is a sectional view of a drive mechanism on the vehicle taken along the line 4—4 of Figure 2.

Referring generally to Figures 1 and 2, a material elevating mechanism is generally designated by the reference character 10. The elevating mechanism 10 comprises a blower housing 11 within which is contained a rotatable blower fan 12. A feed throat 13 is positioned adjacent the blower housing 11 and is provided for the purpose of funneling feed to the blower fan.

A feeding mechanism is indicated by the reference character 14 and this mechanism includes a trough 15 within which are provided a pair of spaced endless chains 16. The chains 16 are connected by means of a plurality of transversely extending slats 17 arranged to move material toward the feed throat 13. The endless chains are trained, at the forward end of the trough 15, about sprockets 18. A shaft 19 is arranged to drive the sprockets 18 and in turn is driven by means of a sprocket 20. A chain 21 actuates the sprocket 20 and in turn is driven by a sprocket 22. A shaft 23 is connected to drive the sprocket 22, said shaft extending into a gear housing 24 mounted on the rear face of the blower housing 11. A shaft 25 is driven by means of a belt 26, said shaft extending into the gear housing 24 for driving pinions therein, not shown. The belt 26 is generally connected to the power take-off pulley of a tractor, not shown.

A gear housing 27 is rigidly secured to the side of the blower housing 11 by means of brackets 28. Within this gear housing 27 there are provided two bevel gears 29 and 30. The bevel gears are in meshing arrangement with one another and the bevel gear 29 is connected to rotate with a rotary driven member 31. The rotary driven member 31 is journaled on a shaft 32 which is also driven by means of the mechanism within the housing 24. A dog 33 is connected to the rotary driven member 31 and may be moved with respect thereto. The dog 33 is positioned so that it may be moved to engage notched portions 34 formed in a driving member 35. A driving member 35 is securely pinned to the shaft as indicated at 36 for rotation therewith. By moving the dog 33 into engagement with the notched portions 34, it can readily be seen that driving engagement is effected, which in turn drives the gear 30. This is a conventional type of clutch mechanism and it is believed not necessary to further describe the same. The bevel gear 30 is connected to a shaft 37 which is journaled in a support 38 formed in the housing 27. The end of the shaft 37 is connected to a universal joint 39 which in turn is connected to a telescoping tubular shaft 40. The tubular shaft 40 is constructed to receive a telescoping member 41. A vertical conduit 42 is connected to the blower housing 11, said conduit being provided to discharge material from the blower.

A vehicle or wagon is generally designated by the reference character 45. The vehicle 45 includes front and rear axles 46 and 47 which are supported in a conventional manner by ground wheels 48. A draw-bar 49 is connected to the front axle 46.

Figure 3:
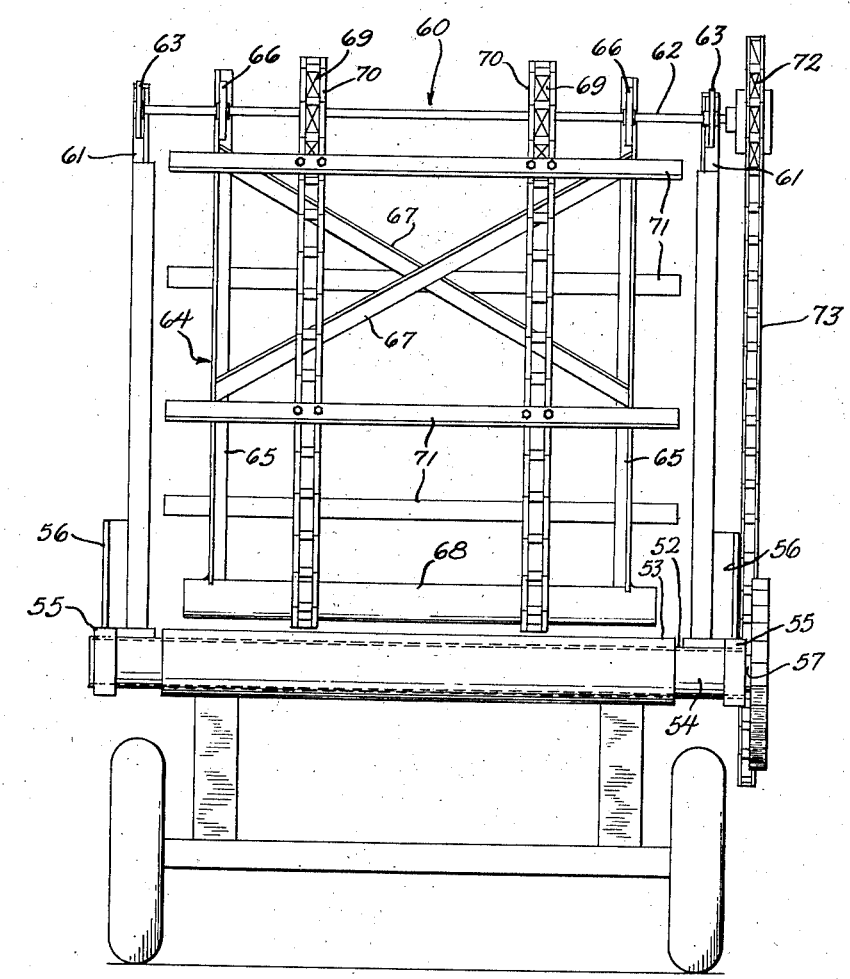
Figure 3 is a rear view of the vehicle showing the scraper mechanism therefor.

The vehicle 45 further includes a wagon box 50 having a discharge end 51 at the rear thereof. The wagon box 50 is also provided with a bottom portion 52, best shown in Figure 2. An apron 53 is carried on the bottom portion 52. The apron 53 extends rearwardly to the discharge end 51 of the wagon where it is wound upon a tubular winding drum 54, as best shown in Figure 3. The tubular winding drum 54 is carried in transversely spaced bearing members 55 which are mounted in extension plates 56 carried on the wagon box. A shaft 57 is connected to drive the winding drum 54 and in turn is driven by means of a ratchet wheel 58.

A scraper or discharging mechanism 60 is positioned at the discharge end 51 of the vehicle. The discharge mechanism includes a pair of spaced supporting members 61 rigidly secured to the sides of the wagon box 51. A transverse shaft 62 is rotated in bearing members 63 which in turn are connected to the supporting members 61. The scraper mechanism 60 includes a scraper frame 64. The scraper frame 64 includes a pair of transversely spaced vertical guide members 65 which are rigidly secured to bearing members 66 journaled on the shaft 62. Since the bearing members 66 and the shaft 62 have pivotal or journaled relation as best shown in Figure 3, the frame 64 is freely swingable so that the lower portion of the frame may be moved adjacent to and away from the discharge end 51 of the bottom portion 52. Connecting members 67 rigidly secure the vertical members 65 to one another. The lower end of the frame 64 is provided with a transversely extending tubular member 68.

Figure 5:
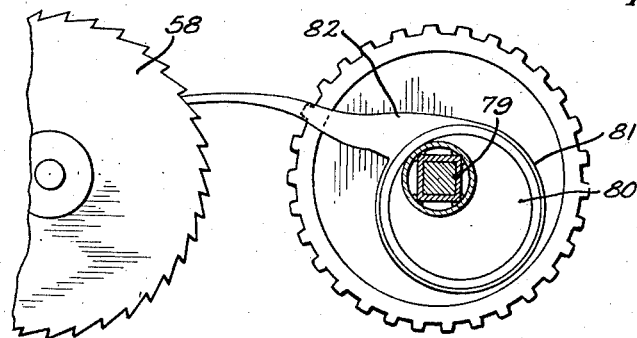
Figure 5 is a sectional view of a portion of the drive mechanism taken along the line 5—5 of Figure 4.

A pair of sprockets 69 are transversely spaced and rotatable by means of the shaft 62. The sprockets 69 are arranged to drive a pair of endless chains 70. Spaced transversely extending angles or cleats 71 are secured to the endless chains 70 for vertical movement therewith. A sprocket 72 is connected to one end of the shaft 62 for driving the same. The sprocket 72 includes a driving chain 73 which extends downwardly for connection to a sprocket 74 forming part of a mechanism generally designated by the reference character 75, as best shown in Figures 4 and 5.

The driving mechanism 75 includes a bracket 76 which rigidly attaches said mechanism to the body 51 of the vehicle. As best shown in Figure 4, the driving mechanism 75 comprises a bearing sleeve 77 which has journaled therein a tubular shaft 78. The tubular shaft 78 is connected at one end to the sprocket 74 for moving the same. The tubular shaft 78 also has provided therein a square tubular stub section 79, best shown in Figure 5. The stub section 79 is rigidly secured within the tubular shaft 78 by means of welding or other fastening processes.

An eccentric 80 is connected to the tubular shaft 78 and rotates therewith. The eccentric is encircled by a cylindrical band 81 which has connected thereto a pawl 82.

The telescoping tubular member 41 is provided at its end with a universal joint 85. The universal joint 85 is in turn connected to a square or a rectangular stub shaft 86. The stub shaft 86 is constructed to fit within the tubular stub section 79 for driving engagement with the same. Since the stub 86 is freely slidable within the tubular stub shaft 19, it can be seen that the universal drive connection can quickly and readily be removed by simply pulling out the stub shaft 86 from engagement with the tubular section 79.

*Operation*

When the farmer wishes to transfer material from the vehicle to the blower, he merely backs up the vehicle adjacent the trough 15. In this position the discharge end 51 is above the trough 15. The feeding mechanism 14 is thereupon set into operation by means of the driving mechanism previously described. The tubular sections 40 and 41 are at this point lying adjacent the housing 27. The shaft 32 is rotating, since it is driven by mechanism within the housing 24. In order to effectively unload the materials or contents from the vehicle to the feeding mechanism 14, the operator places the square stub 86 into telescoping engagement with the square tubular stub 79 and thereupon moves the dog 33 into engagement with the slotted portions 34 of the driving member 35.

The shaft 32 is rotating and in turn rotating movement is imparted to the bevel gears 29 and 30, whereupon the tubular shaft 40 and telescoping shaft 41 are rotated, thereby in turn driving the tubular shaft 78. As the tubular shaft 78 is driven the sprocket 74 moves the chains 73, thereby effecting movement of the sprocket 72. The shaft 62 is now rotated and the scraper elements 71 are moved vertically downwardly as indicated in Figure 2. Since the eccentric 80 is also rotated, the pawl 82 is reciprocated and the ratchet 58 is thereupon moved. Upon movement of the ratchet 58, the tubular winding drum 54 starts rotating and the apron 53 is thereupon wound upon said drum. Movement of the apron 52 toward the discharge end 51 thereupon causes a load carried by said apron to be moved rearwardly into engagement with the scraper mechanism 60. As indicated in the description the lower portion of the frame 64 is swingable in a free and unobstructed manner on the supporting members 61. It is obvious, therefore, as best shown in Figures 2 and 3, that the scraper mechanism 60 engages the load as it is pushed to the discharge end. In the event that the apron 52 moves in too rapid a manner the condition arises wherein too great a load might be pushed to the discharge end. Since the scraper frame is freely swingable, the lower end of the frame 64 may be moved in an arc rearwardly by the material whereby the scrapers can continue their work without danger of the large load causing failure in operation. The freely swingable frame, therefore, assures self-adjustment during operation despite excessive material loads which may be pushed into engagement with the scraper cleats. The scraper mechanism 60 thereupon scrapes off portions of the load into the trough 15 of the feeding mechanism 14. When the vehicle has been unloaded the operator simply removes the square stub shaft 86 from telescoping engagement with the tubular section 79 and he then is ready to drive the wagon away if he so desires.

It can be seen that a novel mechanism has been provided for unloading a wagon. By this mechanism the wagon can very quickly be unloaded without the necessity of an operator manually unloading portions of the load. A movable apron is effective to carry material in the wagon toward the discharge end of the same, whereupon the scraper mechanism completes the efficient distribution and unloading of the material into the feeding mechanism of the blower. By virtue of the novel driving mechanism between the blower proper and the scraper mechanism, quick and positive unloading of the wagon is effective.

It is, of course, readily appreciated that only a preferred embodiment of the invention has been shown and changes may be made in the construction and design which do not depart from the spirit of the invention as disclosed nor the scope thereof as defined in the appended claims.

What is claimed is:

1. A vehicle having a load supporting platform including a discharge end, the combination therewith of means for discharging material from said vehicle comprising a structure having a pair of spaced vertical supports connected at the discharge end, a shaft rotatably carried by said supports, drive members connected to said shaft, a frame structure pivoted on and suspended from said shaft, a transversely extending tubular member connected to the lower end of said frame, rotatable endless flexible drive elements connected to said drive members, said drive elements extending downwardly around said tubular member, spaced transversely extending scraper cleats connected to said flexible drive elements, a movable apron supported on said platform, a drive element on said vehicle for moving said apron and a load carried thereon toward said discharge end, and power means for simultaneously rotating said shaft and for moving said apron thereby vertically moving said scraper cleats into engagement with a portion of the load to discharge the same from said vehicle.

2. In a vehicle having a load supporting platform including a discharge end and means for moving material on said platform to the discharge end; the combination with said platform of mechanism for discharging material from the vehicle comprising a structure having a pair of laterally spaced vertically extending supports positioned on the platform adjacent the discharge end, a shaft rotatably mounted on said supports, drive members connected to said shaft, a scraper frame structure suspended from said shaft, said scraper frame structure being journaled on said shaft whereby the lower end of said frame structure may be freely pivoted adjacent to and away from said platform, endless flexible drive elements connected to said drive members, said drive elements having a plurality of scraper cleats connected thereto, means connected to said shaft for rotating the drive members thereby moving said flexible drive elements whereby the cleats engage material moved to the discharge end of said platform for discharging said material.

3. In a vehicle having a load supporting platform including a discharge end, and movable means on said platform for moving material to said discharge end; the combination with said vehicle of mechanism for discharging material from said platform comprising a supporting structure carried on the platform and extending vertically with respect thereto, a shaft carried by said supporting structure, a scraper frame structure pivotally suspended from said shaft, the lower portion of said frame structure being freely movable adjacent to and away from the discharge end of said platform, a scraper mechanism supported on and movable with said frame structure, and means for moving said scraper mechanism whereby said mechanism engages material moved to the discharge end of said platform for discharging said material.

4. In a vehicle having a load supporting platform including a discharge end, and movable means on said platform for moving material to said discharge end; the combination with said vehicle of mechanism for discharging material from said platform comprising a supporting structure positioned above said platform, a scraper frame structure pivotally suspended from said supporting structure, the lower portion of said frame structure being freely movable adjacent to and away from the discharge end of said platform, a scraper mechanism supported on and movable with said frame structure, and means for moving said scraper mechanism whereby said mechanism engages material moved to the discharge end of said platform for discharging said material.

5. In a vehicle having a load supporting platform including a discharge end, and conveyer means for moving material to said discharge end; the combination with said vehicle of mechanism for discharging material from the platform comprising a supporting structure positioned above said platform, a frame structure having an upper portion pivotally connected to said supporting structure for pivotal movement about a transverse axis with respect to the platform, the lower portion of said frame structure being swingable from and into engagement with a load of material moved to the discharge end of the platform, and a vertically movable scraper mechanism carried by said frame structure, said scraper mechanism including means for engaging and discharging the material.

WALTER R. PETERSON.

REFERENCES CITED

The following references are of record in the file of this patent:

UNITED STATES PATENTS

| Number | Name | Date |
|---|---|---|
| 879,437 | Bloom | Feb. 18, 1908 |
| 956,792 | Beskow et al. | May 3, 1910 |
| 2,434,718 | Recker | Jan. 20, 1948 |
| 2,463,643 | Recker | Mar. 8, 1949 |

FOREIGN PATENTS

| Number | Country | Date |
|---|---|---|
| 713,058 | France | Aug. 10, 1931 |